(12) United States Patent
Sasaki

(10) Patent No.: US 12,463,255 B2
(45) Date of Patent: Nov. 4, 2025

(54) ENERGY STORAGE DEVICE, METHOD FOR MANUFACTURING ENERGY STORAGE DEVICE, AND ENERGY STORAGE APPARATUS

(71) Applicant: GS Yuasa International Ltd., Kyoto (JP)

(72) Inventor: Takeshi Sasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 531 days.

(21) Appl. No.: 17/799,554

(22) PCT Filed: Mar. 15, 2021

(86) PCT No.: PCT/JP2021/010300
§ 371 (c)(1),
(2) Date: Aug. 12, 2022

(87) PCT Pub. No.: WO2021/193184
PCT Pub. Date: Sep. 30, 2021

(65) Prior Publication Data
US 2023/0055059 A1 Feb. 23, 2023

(30) Foreign Application Priority Data
Mar. 23, 2020 (JP) .................................. 2020-050931

(51) Int. Cl.
*H01M 10/0587* (2010.01)
*H01M 4/02* (2006.01)

(52) U.S. Cl.
CPC .. *H01M 10/0587* (2013.01); *H01M 2004/021* (2013.01)

(58) Field of Classification Search
CPC ........ H01G 11/06; H01G 11/24; H01G 11/26; H01G 11/32; H01G 11/42; H01G 11/52;
(Continued)

(56) References Cited

U.S. PATENT DOCUMENTS 5,702,845 A 12/1997 Kawakami et al.
9,997,743 B2 * 6/2018 Nagai .................. H01M 4/505
(Continued)

FOREIGN PATENT DOCUMENTS

JP 8-321300 A 12/1996
JP 2011-119092 A 6/2011
(Continued)

OTHER PUBLICATIONS

JP 2018049708 A—Espacenet Machine Translation, retreived on Mar. 2025 (Year: 2025).*
(Continued)

*Primary Examiner* — Nicole M. Buie-Hatcher
*Assistant Examiner* — Gilberto Ramos Rivera
(74) *Attorney, Agent, or Firm* — RANKIN, HILL & CLARK LLP

(57) ABSTRACT

An aspect of the present invention is an energy storage device including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper (Continued)

end of the electrode assembly and the width Wc of the positive active material layer satisfies the following formula 1:

$$0.8H \leq Wc \leq 2.0H \qquad 1$$

7 Claims, 7 Drawing Sheets

(58) Field of Classification Search
CPC .............. H01G 11/78; H01M 10/0431; H01M 10/0587; H01M 10/4242; H01M 50/103; H01M 50/131
See application file for complete search history.

(56) References Cited

U.S. PATENT DOCUMENTS

| | | |
|---|---|---|
| 2012/0237810 A1 | 9/2012 | Sasaki |
| 2012/0282525 A1* | 11/2012 | Nagai .................. H01M 4/366 429/223 |
| 2013/0316210 A1* | 11/2013 | Morita ................ H01M 10/052 429/211 |
| 2013/0337305 A1 | 12/2013 | Nagai et al. |
| 2014/0302367 A1* | 10/2014 | Ueno ................ H01M 10/0431 429/94 |
| 2017/0162912 A1* | 6/2017 | Ueno ................ H01M 10/0587 |

FOREIGN PATENT DOCUMENTS

| | | |
|---|---|---|
| JP | 2012-209252 A | 10/2012 |
| JP | 2013-131322 A | 7/2013 |
| JP | 5664937 B2 | 2/2015 |
| JP | 2015-103479 A | 6/2015 |
| JP | 2015153727 A * | 8/2015 |
| JP | 2018049708 A * | 3/2018 |
| JP | 2018-85180 A | 5/2018 |
| WO | 2012/117557 A1 | 9/2012 |

OTHER PUBLICATIONS

Son, B. et al. Effect of cathode/anode area ratio on electrochemical performance of lithium-ion batteries. Journal of Power Sources 243 (2013): 641-647. Pag. 644; par. 1 and pag. 647; par. 3 (Year: 2013).*

R. Zhao et al. The effects of electrode thickness on the electrochemical and thermal characteristics of lithium ion battery. Applied Energy 139 (2015) 220â22. Pag. 229; par 1-5 (Year: 2015).*

JP 2015153727 A—Especenet Machine Translation, retreived Mar. 2025 (Year: 2025).*

International Search Report (ISR) dated May 11, 2021 filed in PCT/JP2021/010300.

* cited by examiner

ENERGY STORAGE DEVICE, METHOD FOR MANUFACTURING ENERGY STORAGE DEVICE, AND ENERGY STORAGE APPARATUS

TECHNICAL FIELD

The present invention relates to an energy storage device, a method for manufacturing an energy storage device, and an energy storage apparatus.

BACKGROUND ART

Chargeable and dischargeable energy storage devices (such as a secondary battery and a capacitor) are used for various devices, e.g., vehicles such as electric vehicles and household electric appliances. As an energy storage device, there is known an energy storage device including a wound-type electrode assembly obtained by winding a band-shaped positive electrode and a band-shaped negative electrode stacked on one another with a band-shaped separator interposed therebetween. Such an electrode assembly is housed together with an electrolyte solution in a case to constitute an energy storage device.

As one of methods for increasing the power of an energy storage device, it is known to use hollow active material particles for a positive electrode or a negative electrode (see Patent Documents 1 and 2). In the case of hollow active material particles, an electrolyte solution permeates into the hollows inside the particles, and the area of contact between the active material particles and the electrolyte solution is considered increased, thereby resulting in a reduction in resistance and then an increase in power.

PRIOR ART DOCUMENTS

Patent Documents

Patent Document 1: JP-A-8-321300
Patent Document 2: JP-2011-119092

SUMMARY OF THE INVENTION

Problems to be Solved by the Invention

Such hollow active material particle as mentioned above has a hollow structure and thus has low strength. For this reason, the hollow active material particles are likely to be deformed with repeated charge-discharge, and as a result, the power of the energy storage device is likely to be decreased. Specifically, when the hollow active material particles are expanded at the time of charge, it is difficult for the hollow active material particles to return to the original states even if discharge is performed, which causes a decrease in conductivity between the particles, and the like. Then, the use of the energy storage device externally pressed to press the electrode assembly has been studied for suppressing the expansion of the hollow active material particles at the time charge. When the electrode assembly thus pressed is used, the suppressed expansion of the hollow active material particles causes the hollow active material particles to be deformed such that the hollows become smaller at the time of charge. Thus, the electrolyte solution in the hollows is pushed out to flow out of the electrode assembly. Then, at the time of discharge, as the hollow active material particles return to the original shapes, the electrolyte solution will flow into the hollows of the particles. Such inflow of the electrolyte solution into the electrode assembly is caused by capillary action, and depending on designs such as the strength against pressing the electrode assembly, it may take several minutes to several hours for the electrolyte solution to permeate completely into the electrode assembly to the original state. For this reason, when charge-discharge is frequently repeated, when rapid discharge is performed, or the like, the permeation of the electrolyte solution into the electrode assembly may fail to catch up at the time of discharge, thereby producing a part with the electrolyte solution depleted in the electrode assembly. In particular, in the case of the wound-type electrode assembly, the electrolyte solution can permeate only from both end surfaces of the electrode assembly, and the electrolyte solution is thus more likely to be depleted at the central part of the electrode assembly. In addition, typically, also because the central part of the electrode assembly is mainly pressed, the electrolyte solution is thus likely to be depleted at the central part of the electrode assembly. When the electrolyte solution in the electrode assembly is even partially depleted as described above, the resistance is increased, thereby resulting in a decrease in in power. In addition, when charge-discharge is repeated with the electrolyte solution in the electrode assembly being depleted, the deterioration of the energy storage device is accelerated, thereby causing an increase in resistance.

The present invention has been made in view of the foregoing circumstances, and an object of the present invention is to provide an energy storage device including a wound-type electrode assembly, which is low in resistance even after a charge-discharge cycle, a method for manufacturing the energy storage device, and an energy storage apparatus including such an energy storage device.

Means for Solving the Problems

An aspect of the present invention is an energy storage device (A) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Wc of the positive active material layer satisfies the following formula 1:

$$0.8H \leq Wc \leq 2.0H \qquad 1$$

Another aspect of the present invention is an energy storage device (B) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Wa of the negative active material layer satisfies the following formula 2:

$$0.9H \leq Wa \leq 2.1H \qquad 2$$

Another aspect of the present invention is an energy storage device (C) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Ws of the separator satisfies the following formula 3:

$$1.0H \leq Ws \leq 2.2H \qquad 3$$

Another aspect of the present invention is a method for manufacturing an energy storage device, including: housing, in a case, an electrode assembly obtained by winding a band-shaped positive electrode including a positive active material layer, a band-shaped negative electrode including a negative active material layer, and a band-shaped separator in the longitudinal direction, and an electrolyte solution; and pressing the case, where at least one of the positive active material layer and the negative active material layer contains a hollow active material particle, the winding axis of the electrode assembly is located parallel to the horizontal direction in the housing, at least a central part of the electrode assembly is pressed by the pressing, an excess electrolyte solution that is a part of the electrolyte solution is present between the electrode assembly and the case, the lower end of the electrode assembly has contact with the excess electrolyte solution, and at least one of the following formulas 1 to 3 is satisfied, where H, Wc, Wa, and Ws respectively represent the height from the liquid level of the excess electrolyte solution to the upper end of the electrode assembly, the width of the positive active material layer, the width of the negative active material layer, and the width of the separator.

$$0.8H \leq Wc \leq 2.0H \qquad 1$$

$$0.9H \leq Wa \leq 2.1H \qquad 2$$

$$1.0H \leq Ws \leq 2.2H \qquad 3$$

Another aspect of the present invention is an energy storage apparatus including one or more energy storage devices, where at least one of the one or more energy storage devices is the energy storage device (A), the energy storage device (B), or the energy storage device (C).

Advantages of the Invention

An aspect of the present invention can provide an energy storage device including a wound-type electrode assembly, which is low in resistance even after a charge-discharge cycle, a method for manufacturing the energy storage device, and an energy storage apparatus including such an energy storage device.

MODE FOR CARRYING OUT THE INVENTION

Figure 1:
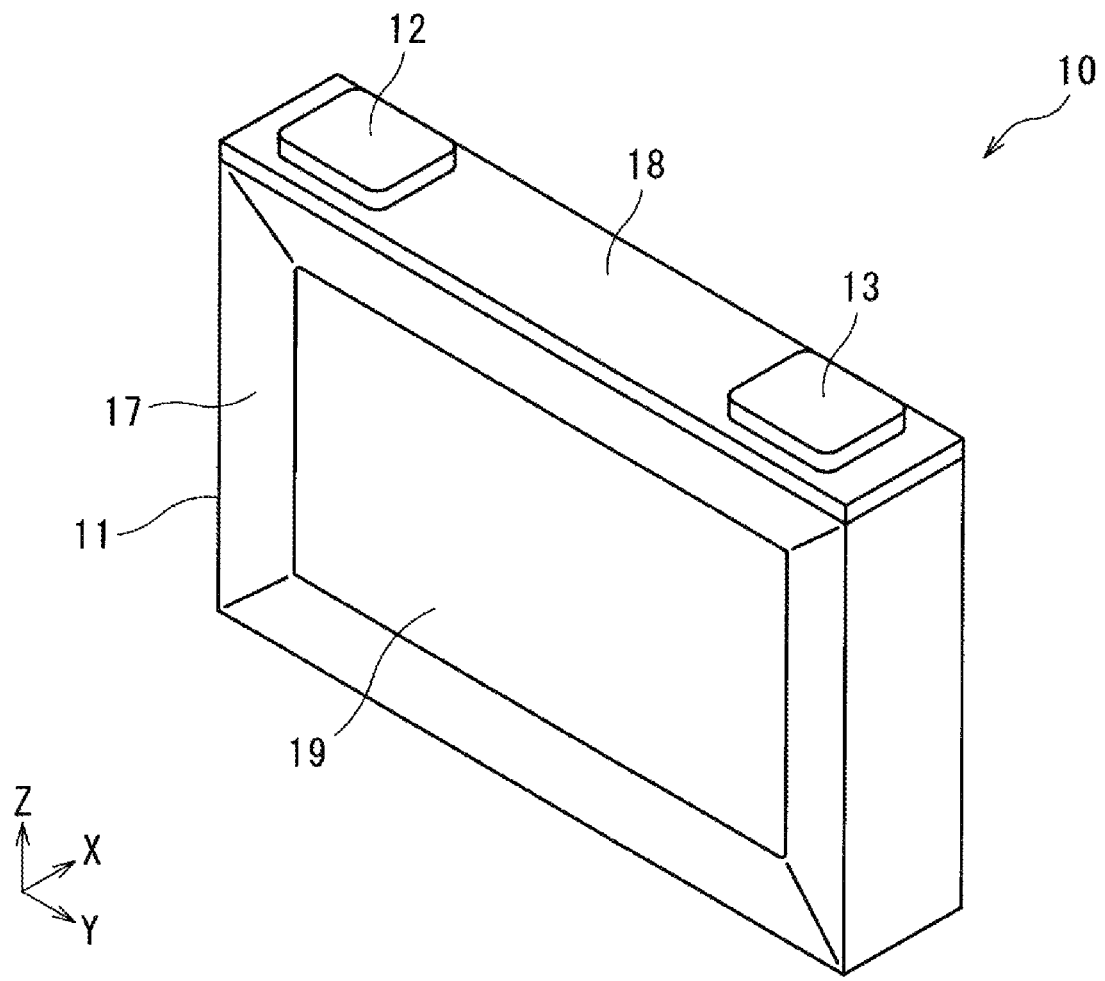
FIG. 1 is a schematic perspective view showing an energy storage device according to an embodiment of the present invention.

First, outlines of an energy storage device, a manufacturing method therefor, and an energy storage apparatus disclosed in the present specification will be described.

An energy storage device according to an aspect of the present invention is an energy storage device (A) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Wc of the positive active material layer satisfies the following formula 1:

$$0.8H \leq Wc \leq 2.0H \qquad 1$$

The energy storage device (A) is an energy storage device including a wound-type electrode assembly, which is low in resistance even after a charge-discharge cycle. Although the reason why such an effect is produced is not clear, the following reason is presumed. In the energy storage device including the wound-type electrode assembly with the winding axis located parallel to the horizontal direction, the excess electrolyte solution in the case permeates into the electrode assembly from the lower ends at both end surfaces of the electrode assembly at the time of discharge (see FIG. 5 or the like). When the width of the electrode assembly, specifically, the width Wc of the positive active material layer is relatively excessively wide, the electrolyte solution is unlikely to permeate into the central part of the electrode assembly, and a part with the electrolyte solution depleted is likely to be produced. Moreover, when the width Wc of the positive active material layer is relatively excessively narrow, the facing area between the positive active material layer and the negative active material layer is reduced, thus increasing the current density at the time of charge-discharge and increasing the initial resistance. In contrast, in the energy storage device (A), the width Wc of the positive active material layer falls within a predetermined range with respect to the height H from the liquid level of the excess electrolyte solution to the upper end of the electrode assembly, and the electrolyte solution is thus more likely to permeate into the entire electrode assembly with high uniformity, thereby making any part with the electrolyte solution depleted unlikely to be produced, and also making the initial resistance adequately low. Accordingly, the energy storage device (A) is assumed to be low in resistance even after a charge-discharge cycle.

It is to be noted that the height of the liquid level of the excess electrolyte solution is considered based on the position of the liquid level in a discharged state. The discharged state is considered as the state of the energy storage device subjected to constant current discharge to an end-of-discharge voltage at a current of 0.2 C. The end-of-discharge voltage may be the minimum value of a discharge voltage at which discharge can be substantially performed, or may be a value determined by settings or the like of an electric apparatus with the energy storage device used. The end-of-discharge voltage may be, for example, 2.5 V. For example, in the case of a nonaqueous electrolyte energy storage device in which the positive active material is a lithium transition metal composite oxide that has an $\alpha$-NaFeO$_2$-type crystal structure or a spinel-type crystal structure, whereas the negative active material is a carbon material (such as graphite or non-graphitic carbon), the end-of-discharge voltage may be 2.5 V. In addition, after the constant current discharge mentioned above, the position of the liquid level is measured after being left for 1 hour or longer.

In addition, the hollow active material particle means an active material particle with a hollow part (void) inside the particle. Specifically, the hollow means that the area ratio R excluding voids in a particle to the area of the entire particle is less than 95% in the cross section of the particle observed in a scanning electron microscope (SEM) image obtained with the use of an SEM. The area ratio R of the hollow active material particles may be 50% or more and 95% or less, or 60% or more and 90% or less. The area ratio R can be determined as follows.

(1) Preparation of Sample for Measurement

The active material particles to be measured are fixed with a thermosetting resin. A cross-section polisher is used to expose the cross section of the active material particles fixed with resin to produce a sample for measurement.

(2) Acquisition of SEM (Scanning Electron Microscope) Image

For acquiring the SEM image, JSM-7001F (manufactured by JEOL Ltd.) is used as a scanning electron microscope. As the SEM image, a secondary electron image is observed. The acceleration voltage is 15 kV. The observation magnification is set so that the number of active material particles appearing in one field of view is 3 or more and 15 or less. The obtained SEM image is stored as an image file. In addition, various conditions such as spot diameter, working distance, irradiation current, luminance, and focus are appropriately set so as to make the contour of the active material particle clear.

(3) Cut-Out of Contour of Active Material Particle

The contour of the active material particle is cut out from the acquired SEM image by using an image cutting function of an image editing software Adobe Photoshop Elements 11. The contour is cut out by using a quick selection tool to select the outside of the contour of the active material particle and edit a portion except for the active material particle to a black background. At this time, when the number of the active material particles from which the contours have been able to be cut out is less than three, the SEM image is acquired again, and the cutout is performed until the number of the active material particles from which the contours have been able to be cut out becomes three or more.

(4) Binarization Processing

The image of the first active material particle among the cut-out active material particles is binarized by using image analysis software PopImaging 6.00 to set to a threshold value a concentration 20% lower than a concentration at which the intensity becomes maximum. By the binarization processing, an area on the low-concentration side is calculated to obtain "an area $S_1$ excluding voids in the particles". Next, the image of the first active material particle is binarized using a concentration 10 as a threshold value. The outer edge of the active material particle is determined by the binarization processing, and the area inside the outer edge is calculated to obtain "the area $S_0$ of the whole particle". By calculating the proportion $(S_1/S_0)$ of $S_1$ relative to $S_0$ with the use of $S_1$ and $S_0$ calculated above, "the area ratio $R_1$ $(=S_1/S_0)$ excluding voids in the particles relative to the area of the whole particle" in the first active material particle is calculated. The images of the second and subsequent active material particles among the cut-out active material particles are also subjected to the binarization processing described above, and the areas $S_1$ and $S_0$ are calculated. Based on the calculated areas $S_1$, $S_0$, area ratios $R_2$, $R_3$, ... of the respective active material particles are calculated.

(5) Determination of Area Ratio R

By calculating the average value of all the area ratios $R_1$, $R_2$, $R_3$, ... calculated by the binarization processing, "the area ratio R of the active material particles excluding voids in the particles relative to the total area of the particles" is determined.

An energy storage device according to another aspect of the present invention is an energy storage device (B) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Wa of the negative active material layer satisfies the following formula 2:

$$0.9H \leq Wa \leq 2.1H \qquad (2)$$

The energy storage device (B) is also an energy storage device including a wound-type electrode assembly, which is low in resistance even after a charge-discharge cycle. Although the reason why such an effect is produced is not clear, the same reason described above for the energy storage device (A) is presumed, that is, it is presumed that because the width Wa of the negative active material layer falls within a predetermined range with respect to the height H from the liquid level of the excess electrolyte solution to the upper end of the electrode assembly, the electrolyte solution is more likely to permeate into the entire electrode assembly with high uniformity, thereby making any part with the electrolyte solution depleted unlikely to be produced, and also making the initial resistance adequately low.

An energy storage device according to another aspect of the present invention is an energy storage device (C) including: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and the relationship between the height H from the liquid level of the excess electrolyte solution to the upper end of the electrode assembly and the width Ws of the separator satisfies the following formula 3:

$$1.0H \leq Ws \leq 2.2H \qquad (3)$$

The energy storage device (C) is also an energy storage device including a wound-type electrode assembly, which is low in resistance even after a charge-discharge cycle. Although the reason why such an effect is produced is not clear, the same reason described above for the energy storage device (A) is presumed, that is, it is presumed that because the width Ws of the separator falls within a predetermined range with respect to the height H from the liquid level of the excess electrolyte solution to the upper end of the electrode assembly, the electrolyte solution is more likely to permeate into the entire electrode assembly with high uniformity, thereby making any part with the electrolyte solution depleted unlikely to be produced, and also making the initial resistance adequately low.

In the energy storage device (A), the energy storage device (B), and the energy storage device (C), the relationship between: the average thickness Tc of the positive active material layer, the average thickness Ta of the negative active material layer, and the average thickness Ts of the separator; and the height H preferably satisfies the following formula 4:

$$1.0H \leq 500(Tc+Ta+Ts) \leq 2.0H \qquad (4)$$

In such a case, the resistance of the energy storage device after a charge-discharge cycle is lower. Although the reason therefor is not clear, it is presumed that the adjustment of the total thickness of the positive active material layer, negative active material layer, and separator, which are porous parts into which the electrolyte solution permeates, provides the suitable permeation rate of the electrolyte solution in the height direction by capillary action, thereby allowing the electrolyte solution to permeate adequately to the upper end part of the electrode assembly in the case of a relationship that satisfies the above-mentioned formula 4.

It is to be noted that the average thickness Tc of the positive active material layer refers to the average thickness for the total of one or more positive active material layers provided for one positive electrode, and for example, when two positive active material layers are provided for the positive electrode, the average thickness Tc refers to the average thickness for the total of the two positive active material layers. For example, when the positive electrode has a structure that has a positive active material layer provided on each of both surfaces of the positive electrode substrate, the value obtained by subtracting the average thickness of the positive electrode substrate from the average thickness of the positive electrode is the average thickness Tc of the positive active material layer. The same applies to the average thickness Ta of the negative active material layer. In addition, the average thickness Tc of the positive active material layer, the average thickness Ta of the negative active material layer, and the average thickness Ts of the separator are each regarded as an average of measured values of thicknesses at arbitrary five sites.

A method for manufacturing an energy storage device according to an aspect of the present invention is a method for manufacturing an energy storage device, including: housing, in a case, an electrode assembly obtained by winding a band-shaped positive electrode including a positive active material layer, a band-shaped negative electrode including a negative active material layer, and a band-shaped separator in the longitudinal direction, and an electrolyte solution; and pressing the case, where at least one of the positive active material layer and the negative active material layer contains a hollow active material particle, the winding axis of the electrode assembly is located parallel to the horizontal direction in the housing, at least a central part of the electrode assembly is pressed by the pressing, an excess electrolyte solution that is a part of the electrolyte solution is present between the electrode assembly and the case, the lower end of the electrode assembly has contact with the excess electrolyte solution, and at least one of the following formulas 1 to 3 is satisfied, where H, Wc, Wa, and Ws respectively represent the height from the liquid level of the excess electrolyte solution to the upper end of the electrode assembly, the width of the positive active material layer, the width of the negative active material layer, and the width of the separator.

$$0.8H \leq Wc \leq 2.0H \qquad (1)$$

$$0.9H \leq Wa \leq 2.1H \qquad (2)$$

$$1.0H \leq Ws \leq 2.2H \qquad (3)$$

This manufacturing method is capable of manufacturing an energy storage device including a wound-type electrode assembly, which is low in resistance even after a charge-discharge cycle.

An energy storage apparatus according to an aspect of the present invention is an energy storage apparatus including one or more energy storage devices, where at least one of the one or more energy storage devices is the energy storage device (A), the energy storage device (B), or the energy storage device (C).

The energy apparatus is an energy storage apparatus including an energy storage device including a wound-type electrode assembly, which is low in resistance even after a charge-discharge cycle.

Hereinafter, an energy storage device, a method for manufacturing the energy storage device, and an energy storage apparatus according to an embodiment of the present invention will be described in detail.

<Energy Storage Device>

Figure 2:
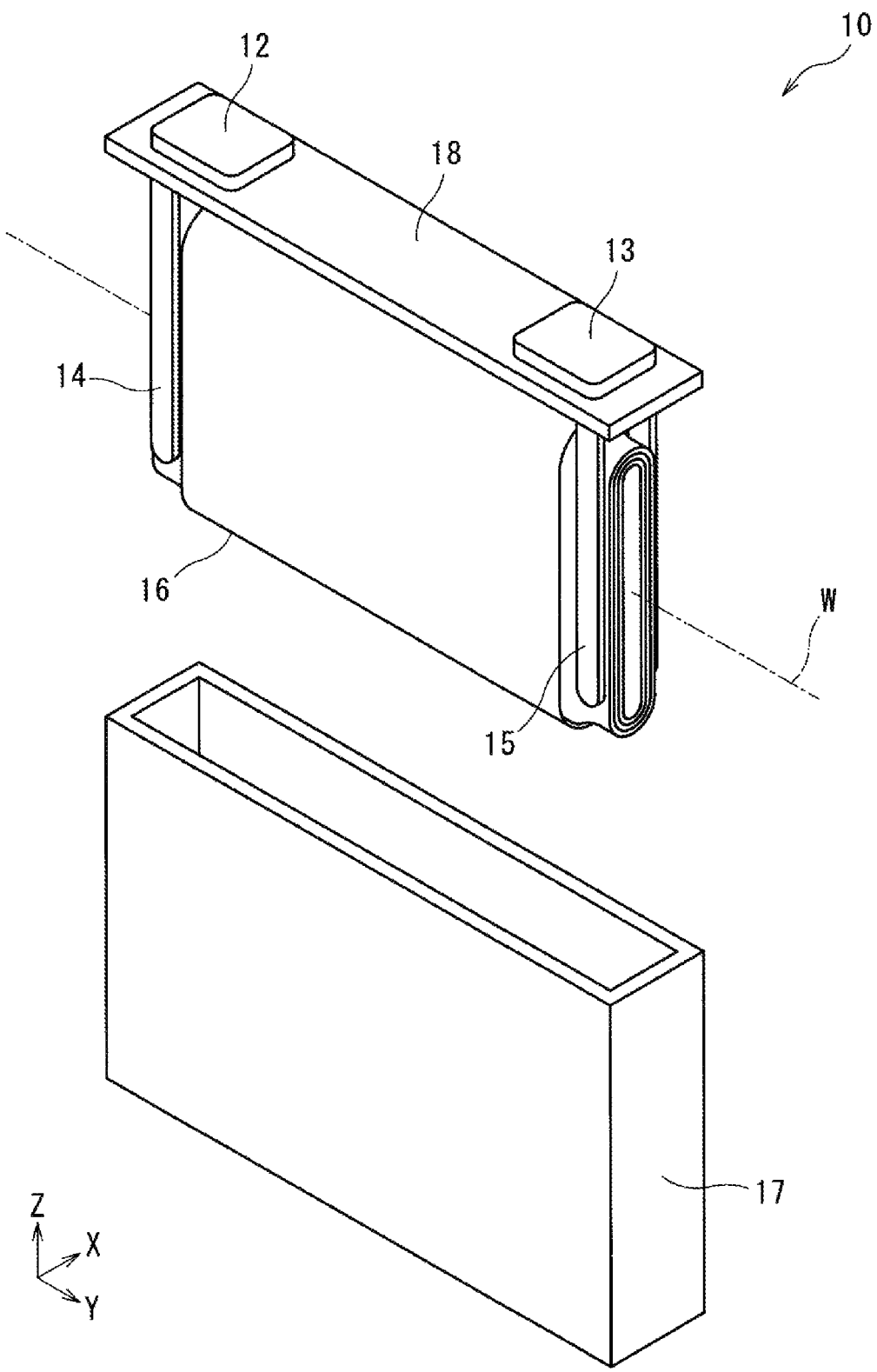
FIG. 2 is a schematic perspective view illustrating constituent elements disposed in a case of the energy storage device in FIG. 1.

FIG. 1 is a perspective view illustrating the appearance of an energy storage device 10 according to an embodiment of the present invention. FIG. 2 is a perspective view illustrating constitutional elements disposed in a case of the energy storage device 10. It is to be noted that the alternate long and short dash line denoted by a reference symbol W in FIG. 2 represents the winding axis of an electrode assembly 16. The winding axis W is an imaginary axis, which is a straight line parallel to the Y axis in the present embodiment.

As shown in FIG. 1, the energy storage device 10 includes a case 11, a positive electrode terminal 12, and a negative electrode terminal 13. In addition, as shown in FIG. 2, the energy storage device 10 includes a positive current collector 14, a negative current collector 15, and an electrode assembly 16 which are housed in the case 11 (case body 17). The energy storage device 10 further includes an electrolyte solution (not shown in FIG. 2) housed in the case 11.

The case 11 includes the rectangular cylindrical case body 17 with a bottom, and a lid body 18 that is a plate-like member for closing an opening of the case body 17. The case 11 is typically made of a metal or a resin. The inside of the case 11 has a structure sealed by welding or the like the lid body 18 and the case body 17 after housing the electrode assembly 16 and the like inside. In addition, after the inside is sealed, wall surfaces 19 (a pair of wall surfaces 19 with the X-axis direction as a normal direction) of the case 11 are compressed in a shape recessed inward. The case 11 is compressed as described above, thereby making at least the central part of the electrode assembly 16 pressed.

The positive electrode terminal 12 is an electrode terminal electrically connected to a positive electrode of the electrode assembly 16 via the positive current collector 14. The negative electrode terminal 13 is an electrode terminal electrically connected to a negative electrode of the electrode assembly 16 via the negative current collector 15. The positive electrode terminal 12 and the negative electrode terminal 13 are attached to the lid body 18 disposed above the electrode assembly 16 via a gasket (not shown) that has an insulating property.

The positive current collector 14 is a conductive member that electrically connects the positive electrode terminal 12 and the positive electrode of the electrode assembly 16. The negative current collector 15 is a conductive member that electrically connects the negative electrode terminal 13 and the negative electrode of the electrode assembly 16. The positive current collector 14 and the negative current collector 15 are fixed to the lid body 18. In addition, the positive current collector 14 is joined to a positive-electrode-side end of the electrode assembly 16, and the negative current collector 15 is joined to a negative-electrode-side end of the electrode assembly 16.

Figure 3:
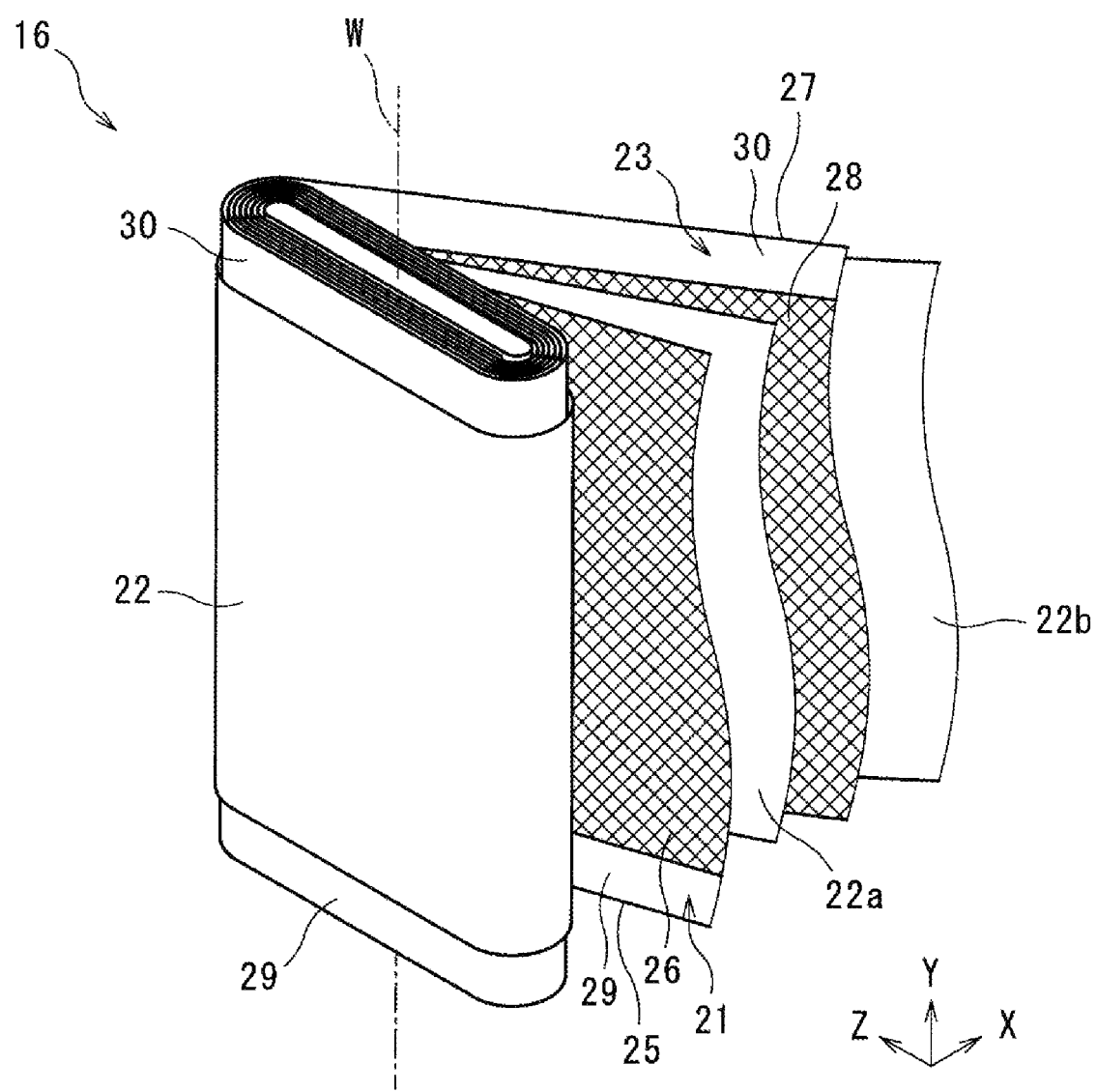
FIG. 3 is a schematic perspective view illustrating a configuration outline of an electrode assembly of the energy storage device in FIG. 1.

The electrode assembly 16 is a flattened wound-type electrode assembly. As shown in FIG. 3, the electrode assembly 16 is formed by winding, in the longitudinal direction, a band-shaped positive electrode 21, a band-shaped first separator 22a, a band-shaped negative electrode 23, and a band-shaped second separator 22b stacked in this order. The electrode assembly 16 is disposed such that the winding axis W is parallel to the horizontal direction (Y axis). In the energy storage device 10, the winding axis W of the electrode assembly 16 is parallel to the bottom surface of the case 11.

Figure 6:
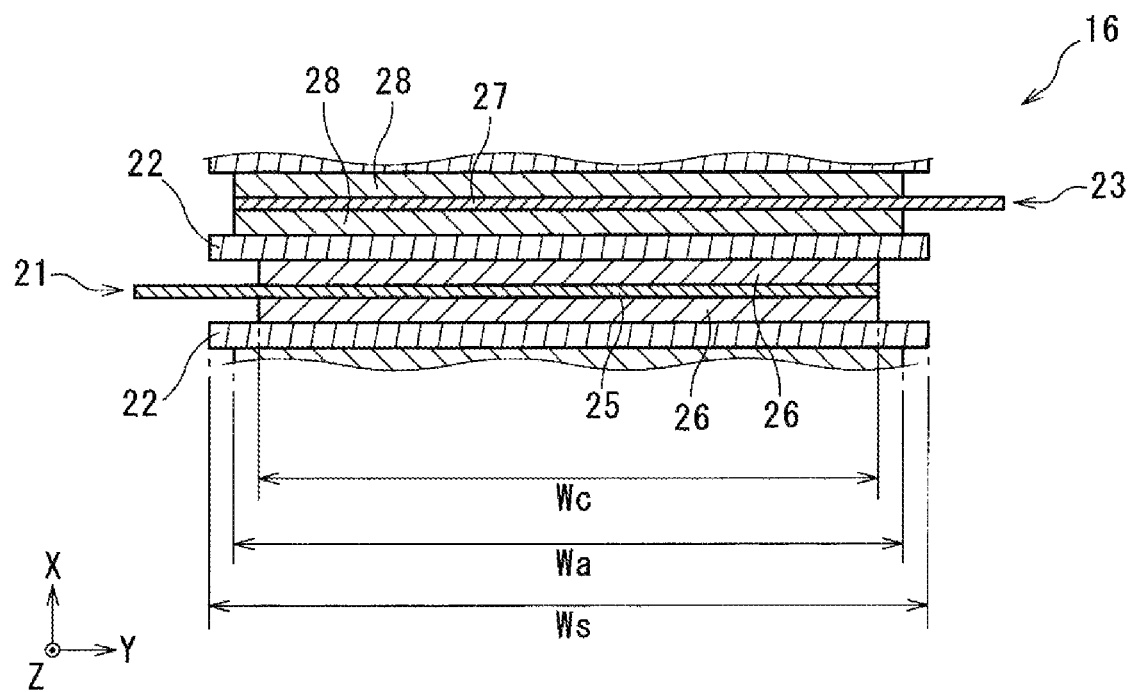
FIG. 6 is a schematic partial cross-sectional view of the electrode assembly of the energy storage device in FIG. 1.

As shown in FIGS. 3 and 6, the positive electrode 21 has a belt-like positive electrode substrate 25 and positive active material layers 26 laminated respectively on both surfaces of the positive electrode substrate 25. The negative electrode 23 has a belt-like negative electrode substrate 27 and negative active material layers 28 laminated respectively on both surfaces of the negative electrode substrate 27. The positive electrode substrate 25 and the negative electrode substrate 27 are conductive substrates such as metal foils. At least one of the positive active material layer 26 and the negative active material layer 28 has hollow active material particles. The positive active material layer 26 and the negative active material layer 28 preferably both have hollow active material particles. Details of each component will be described later.

In the electrode assembly 16, the positive electrode 21 and the negative electrode 23 are wound while being shifted from each other in the direction of the winding axis W with the separator 22 (22a, 22b) interposed therebetween. Specifically, the positive electrode 21 has, at one end in the direction of the winding axis W (an end on the minus side in the Y axis direction in FIG. 3), a positive active material layer non-laminated part 29 without any positive active material layer 26 laminated. In addition, the negative electrode 23 has, at the other end in the direction of the winding axis W (an end on the plus side in the Y axis direction in FIG. 3), a negative active material layer non-laminated part 30 without any negative active material layer 28 laminated. As described above, the positive-electrode-side end is formed by the exposed positive electrode substrate 25 (positive active material layer non-laminated part 29), and the negative-electrode-side end is formed by the exposed negative electrode substrate 27 (negative active material layer non-laminated part 30). The positive-electrode-side end is joined to the positive current collector 14, and the negative-electrode-side end is joined to the negative current collector 15.

In this flattened wound-type electrode assembly 16, typically, the central part of the flat part is mainly pressed. More specifically, typically, the largest load is applied to the central part of the electrode assembly 16 as viewed in the X-axis direction.

Figure 4:
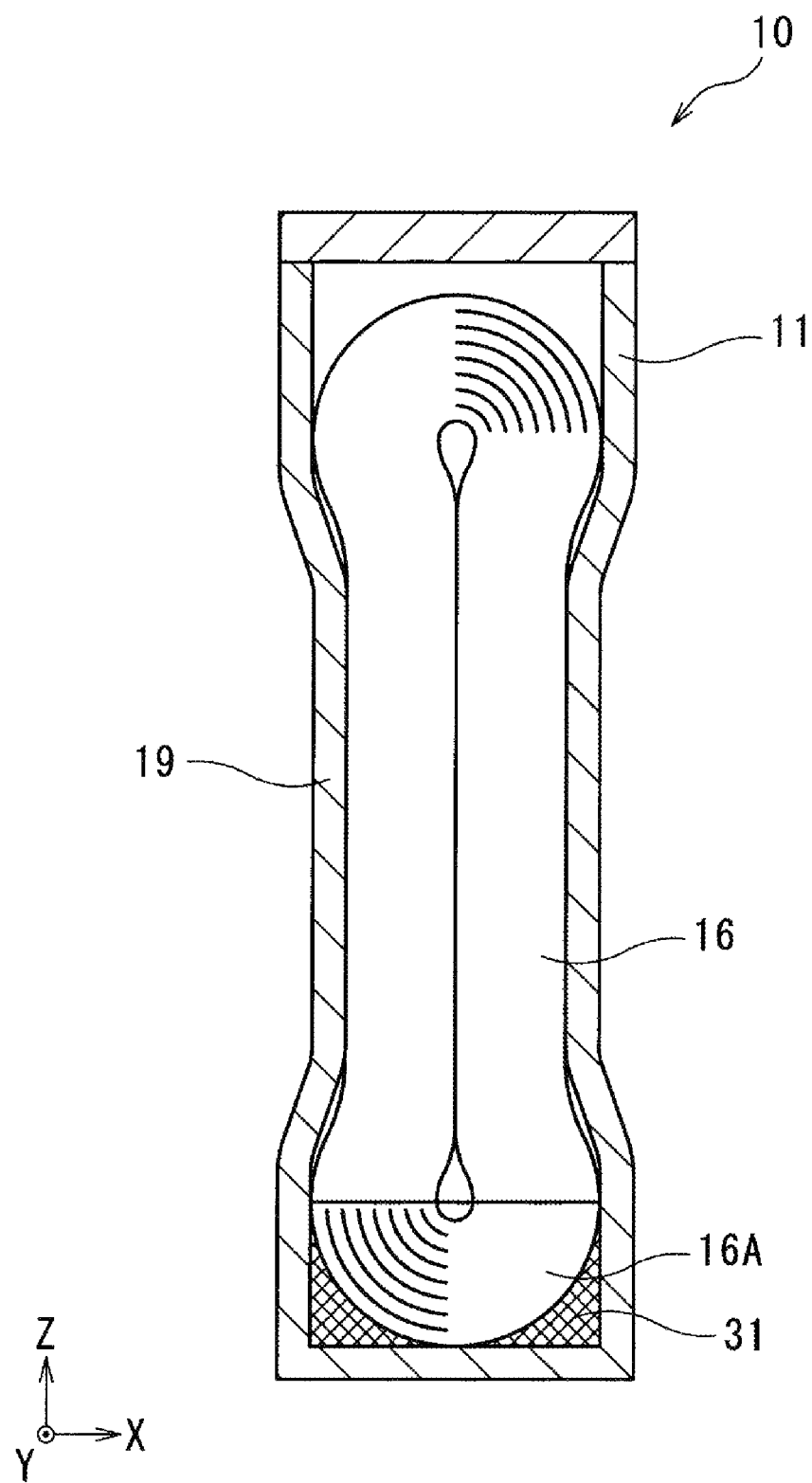
FIG. 4 is a schematic cross-sectional view of the energy storage device in FIG. 1.

The electrolyte solution is further housed in the case 11 as described above. The porous positive active material layer 26, negative active material layer 28, and separator 22 are impregnated with the electrolyte solution, and the electrolyte solution is partially accumulated as an excess electrolyte solution 31 on the bottom of the case 11. More specifically, as shown in FIG. 4, the excess electrolyte solution 31 is present between the electrode assembly 16 and the case 11. Further, at least the lower end of the electrode assembly 16 has contact with the excess electrolyte solution 31. The lower end of the electrode assembly 16 is preferably immersed in the excess electrolyte solution 31. For example, at least a half of a lower curved part 16A (semicircular part in cross-sectional view) of the electrode assembly 16, preferably substantially the entire lower curved part 16A of the electrode assembly 16 is more preferably immersed in the excess electrolyte solution 31.

Figure 5:
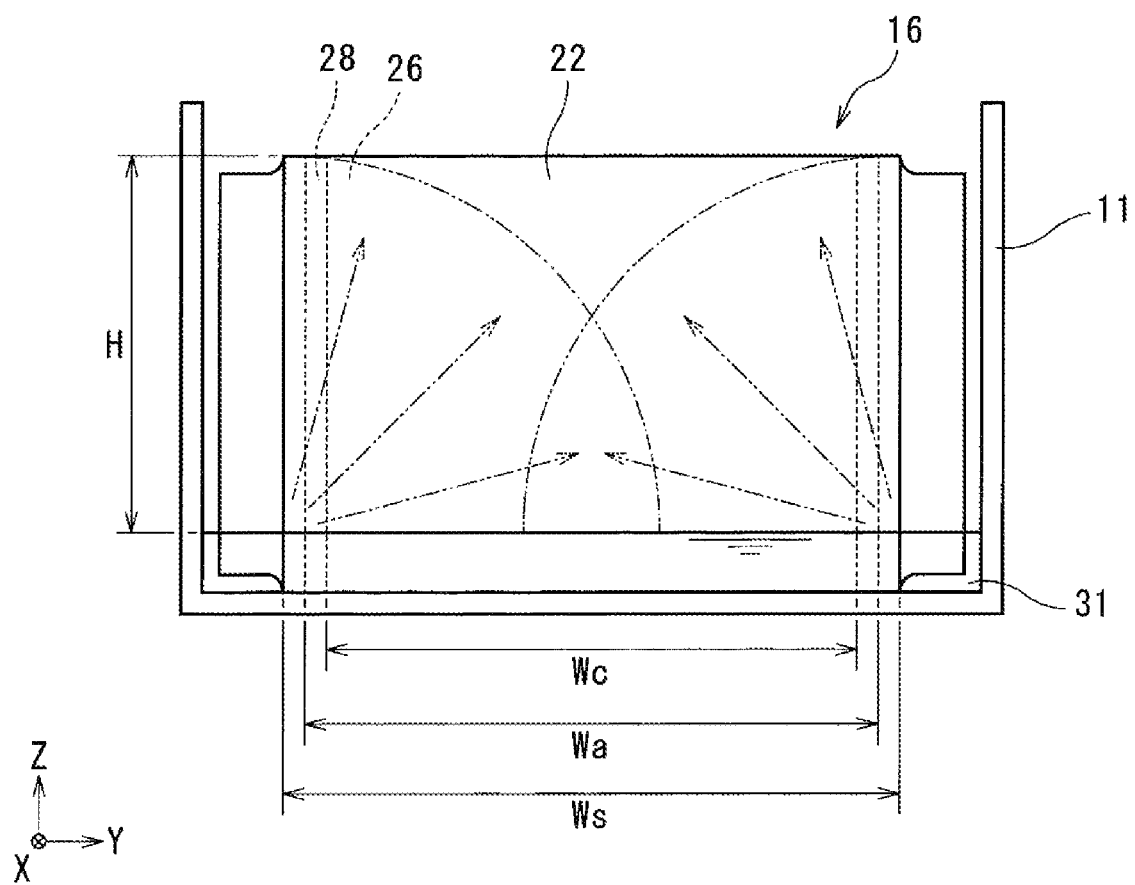
FIG. 5 is a schematic view illustrating the relationship between the electrode assembly of the energy storage device in FIG. 1 and an excess electrolyte solution.

In an aspect of the energy storage device 10, the relationship between the height H from the liquid level of the excess electrolyte solution 31 to the upper end of the electrode assembly 16 and the width Wc of the positive active material layer 26 satisfies the following formula 1 (see FIGS. 5 and 6).

$$0.8H \leq Wc \leq 2.0H \qquad 1$$

The lower limit of Wc is preferably 1.0H, more preferably 1.2H, still more preferably 1.4H, even more preferably 1.6H, and particularly preferably 1.8H. The upper limit of Wc is preferably 1.9H. When Wc is set to be equal to or more than the above lower limit, the electrolyte solution can permeate adequately to the upper end of the electrode assembly 16, and initial resistance can be thus lowered. In addition, the volume ratio of the positive active material layer 26 to the volume of the energy storage device 10 can be adequately increased, and the energy density per volume of the energy storage device can be thus increased. In contrast, when Wc is set to be equal to or less than the above upper limit, the electrolyte solution can permeate adequately into the central part of the electrode assembly 16. Accordingly, in the energy storage device 10, when Wc falls within the above-mentioned range, the resistance is low even after a charge-discharge cycle.

In an aspect of the energy storage device 10, the relationship between the height H from the liquid level of the excess electrolyte solution 31 to the upper end of the electrode assembly 16 and the width Wa of the negative active material layer 28 satisfies the following formula 2 (see FIGS. 5 and 6).

$$0.9H \leq Wa \leq 2.1H \qquad 2$$

The lower limit of Wa is preferably 1.0H, more preferably 1.2H, still more preferably 1.4H, even more preferably 1.6H, and particularly preferably 1.8H. The upper limit of Wa is preferably 2.0H. When Wa is set to be equal to or more than the above lower limit, the electrolyte solution can permeate adequately to the upper end of the electrode assembly 16, and initial resistance can be thus lowered. In addition, the volume ratio of the negative active material layer 28 to the volume of the energy storage device 10 can be adequately increased, and the energy density per volume of the energy storage device can be thus increased. In contrast, when Wa is set to be equal to or less than the above upper limit, the electrolyte solution can permeate adequately into the central part of the electrode assembly 16. Accordingly, in the energy storage device 10, when Wa falls within the above-mentioned range, the resistance is low even after a charge-discharge cycle.

In an aspect of the energy storage device 10, the relationship between the height H from the liquid level of the excess electrolyte solution 31 to the upper end of the electrode assembly 16 and the width Ws of the separator 22 satisfies the following formula 3 (see FIGS. 5 and 6).

$$1.0H \leq Ws \leq 2.2H \qquad 3$$

The lower limit of Ws is preferably 1.2H, more preferably 1.4H, still more preferably 1.6H, even more preferably 1.8H, and particularly preferably 1.9H. The upper limit of Ws is preferably 2.0H. When Ws is set to be equal to or more than the above upper limit, the electrolyte solution can permeate adequately to the upper end of the electrode assembly 16. In general, the positive active material layer 26 and the negative active material layer 28 are smaller in width than the separator 22. Accordingly, when the width of the separator 22 is adequately increased, the widths of the positive active material layer 26 and negative active material layer 28 can be increased, and the volume ratios of the positive active material layer 26 and negative active material layer 28 to the volume of the energy storage device 10 can be adequately increased, and thus, the energy density per volume of the energy storage device can be increased. In contrast, when Ws is set to be equal to or less than the above upper limit, the electrolyte solution can permeate adequately into the central part of the electrode assembly 16. Accordingly, in the energy storage device 10, when Ws falls within the above-mentioned range, the resistance is low even after a charge-discharge cycle.

In one aspect of the energy storage device 10, at least one of the following formulas 1 to 3 is satisfied, where H, Wc, Wa, and Ws respectively represent the height from the liquid level of the excess electrolyte solution 31 to the upper end of the electrode assembly 16, the width of the positive active material layer 26, the width of the negative active material layer 28, and the width of the separator 22.

$$0.8H \leq Wc \leq 2.0H \qquad 1$$

$$0.9H \leq Wa \leq 2.1H \qquad 2$$

$$1.0H \leq Ws \leq 2.2H \qquad 3$$

Wc, Wa, and Ws have the same preferable ranges as the ranges mentioned above.

It is to be noted that the height H from the liquid level of the excess electrolyte solution 31 to the upper end of the electrode assembly 16 may be, for example, 30 mm or more and 150 mm or less, and may be 40 mm or more and 120 mm or less.

The relationship among the average thickness Tc of the positive active material layer 26, the average thickness Ta of the negative active material layer 28, the average thickness Ts of the separator 22, and the height H preferably satisfies the following formula 4.

$$1.0H \leq 500(Tc+Ta+Ts) \leq 2.0H \qquad 4$$

The lower limit of 500(Tc+Ta+Ts) is more preferably 1.2H, still more preferably 1.4H. The upper limit of 500 (Tc+Ta+Ts) is more preferably 1.8H, still more preferably 1.6H. When the value of 500(Tc+Ta+Ts) falls within the above-mentioned range, the electrolyte solution can permeate adequately to the upper end part of the electrode assembly 16, thereby causing the resistance after a charge-discharge cycle to become lower.

The average thickness Tc of the positive active material layer 26 may be, for example, 10 μm or more and 200 μm or less, and may be 20 μm or more and 100 μm or less. The average thickness Ta of the negative active material layer 28 may be, for example, 10 μm or more and 200 μm or less, and may be 20 μm or more and 120 μm or less. The average thickness Ts of the separator 22 may be 5 μm or more and 100 μm or less, and may be 10 μm or more and 40 μm or less.

In addition, the relationship between: the average thickness Tp of the porous part between the positive electrode substrate 25 and the negative electrode substrate 27; and the height H preferably satisfies the following formula 5.

$$1.1H \leq 1000Tp \leq 2.2H \qquad 5$$

The lower limit of 1000Tp is more preferably 1.2H, still more preferably 1.4H, and even more preferably 1.6H. The upper limit of 1000Tp is more preferably 2.0H, still more preferably 1.9H. When the value of 1000Tp falls within the above-mentioned range, the electrolyte solution can permeate adequately to the upper end part of the electrode assembly 16, thereby causing the resistance after a charge-discharge cycle to become lower.

In the energy storage device 10 according to the present embodiment, shown by FIG. 6 and the like, the average thickness Tp refers to the sum of: the average thickness of one positive active material layer 26; the average thickness of one layer negative active material layer 28; and the average thickness of the separator 22. The average thickness of one positive active material layer 26 may be, for example, 5 μm or more and 100 μm or less, and may be 10 μm or more and 50 μm or less. The average thickness of one negative active material layer 28 may be, for example, 5 μm or more and 100 μm or less, and may be 10 μm or more and 60 μm or less.

The energy storage device according to an embodiment of the present invention can be suitably used in applications where the permeation of an electrolyte solution into an electrode assembly is likely to fail to catch up at the time of discharge, such as a case where charge-discharge is frequently repeated or a case where discharge is rapidly performed. Examples of such applications include a power source for a vehicle, and the energy storage device is suitably used in particular, as a power supply for an automobile such as an electric vehicle (EV), a hybrid electric vehicle (HEV), or a plug-in hybrid electric vehicle (PHEV).

Hereinafter, main constituent members of an energy storage device according to an embodiment of the present invention will be described in detail.

(Positive Electrode)

The positive electrode 21 has, as mentioned above, a positive electrode substrate and a positive active material layer laminated on both surfaces of the positive electrode substrate. Further, the positive electrode may further have an intermediate layer between the positive electrode substrate and the positive active material layer. In addition, it is also possible to use a positive electrode that has a positive active material layer laminated on only one surface of a positive electrode substrate.

The positive electrode substrate has conductivity. Whether the positive substrate has "conductivity" or not is determined with the volume resistivity of $10^7$ Ω·cm measured in accordance with JIS-H-0505 (1975) as a threshold. As the material of the positive electrode substrate, a metal such as aluminum, titanium, tantalum, or stainless steel, or an alloy thereof is used. Among these materials, aluminum or an aluminum alloy is preferable from the viewpoint of electric potential resistance, high conductivity, and costs. Examples of the positive electrode substrate include a foil, a deposited film, a mesh, and a porous material, and a foil is preferable from the viewpoint of costs. Accordingly, the positive electrode substrate is preferably an aluminum foil or an aluminum alloy foil. Examples of the aluminum or aluminum alloy include A1085, A3003, A1N30, and the like specified in JIS-H-4000 (2014) or JIS-H-4160 (2006).

The positive electrode substrate may be a plate or sheet that is substantially uniform in thickness. The average thickness of the positive electrode substrate is preferably 3 μm or more and 50 μm or less, more preferably 5 μm or more and 40 μm or less, still more preferably 8 μm or more and 30 μm or less, and particularly preferably 10 μm or more and 25 μm or less. When the average thickness of the positive electrode substrate is within the above-described range, it is possible to enhance the energy density per volume of the energy storage device while increasing the strength of the positive electrode substrate. The "average thickness" of the positive electrode substrate and the negative electrode substrate described below refers to a value obtained by dividing a cutout mass in cutout of a substrate having a predetermined area by a true density and a cutout area of the substrate.

The intermediate layer is a layer arranged between the positive electrode substrate and the positive active material layer. The intermediate layer contains a conductive agent such as carbon particles to reduce contact resistance between the positive electrode substrate and the positive active material layer. The configuration of the intermediate layer is not particularly limited, and includes, for example, a binder and a conductive agent.

The positive active material layer includes a positive active material. The positive active material layer contains optional components such as a conductive agent, a binder (binding agent), a thickener, a filler, or the like, if necessary.

The positive active material can be appropriately selected from known positive active materials. As the positive active material for a lithium ion secondary battery, a material capable of storing and releasing lithium ions is typically used. Examples of the positive active material include lithium-transition metal composite oxides having an α-NaFeO$_2$-type crystal structure, lithium-transition metal oxides having a spinel-type crystal structure, polyanion compounds, chalcogenides, and sulfur. Examples of the lithium transition metal composite oxide having an α-NaFeO$_2$ type crystal structure include Li[Li$_x$Ni$_{(1-x)}$]O$_2$ (0≤x<0.5), Li[Li$_x$Ni$_y$Co$_{(1-x-y)}$]O$_2$ (0≤x<0.5, 0<γ<1), Li[Li$_x$Co$_{(1-x)}$]O$_2$ (0≤x<0.5), Li[Li$_x$Ni$_y$Mn$_{(1-x-y)}$]O$_2$ (0≤x<0.5, 0<γ<1), Li[Li$_x$Ni$_y$Mn$_\beta$Co$_{(1-x-y-\beta)}$]O$_2$ (0≤x<0.5, 0<γ, 0<β, 0.5<γ+β<1), and Li[Li$_x$Ni$_y$Co$_\beta$Al$_{(1-x-y-\beta)}$]O$_2$ (0≤x<0.5, 0<γ, 0<β, 0.5<γ+β<1). Examples of the lithium-transition metal composite oxides having a spinel-type crystal structure include Li$_x$Mn$_2$O$_4$ and Li$_x$Ni$_y$Mn$_{(2-y)}$O$_4$. Examples of the polyanion compounds include LiFePO$_4$, LiMnPO$_4$, LiNiPO$_4$, LiCoPO$_4$, Li$_3$V$_2$(PO$_4$)$_3$, Li$_2$MnSiO$_4$, and Li$_2$CoPO$_4$F. Examples of the chalcogenides include titanium disulfide, molybdenum disulfide, and molybdenum dioxide. Some of atoms or polyanions in these materials may be substituted with atoms or anion species composed of other elements. The surfaces of these materials may be coated with other materials. In the positive active material layer, one of these materials may be used singly or two or more of these materials may be used in mixture.

The positive active material is usually particles (powder). The average particle size of the positive active material is, for example, preferably 0.1 μm or more and 20 μm or less, more preferably 2 μm or more and 10 μm or less. By setting the average particle size of the positive active material to be equal to or greater than the lower limit, the positive active material is easily manufactured or handled. By setting the average particle size of the positive active material to be equal to or less than the upper limit, the electron conductivity of the positive active material layer is improved. It is to be noted that in the case of using a composite of the positive active material and another material, the average particle size of the composite is regarded as the average particle size of the positive active material. The term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

At least one of the positive active material and the negative active material described later includes hollow active material particles. The hollow active material particle is typically a porous particle that has a through hole penetrated from the outer surface to the hollow part or a communicating hole communicated from the outer surface to the hollow. Examples of the hollow positive active material particle include a secondary particle that has an assembly of multiple primary particles of a positive active material such as a lithium transition metal composite oxide, with a hollow formed inside the secondary particle. For the hollow positive active material particles, known hollow positive active material particles described in above-mentioned Patent Documents 1 and 2 and the like can be used, and the hollow positive active material particles can be produced by known methods described in Patent Documents 1 and 2 and the like.

The content of the positive active material in the positive active material layer is preferably 50% by mass or more and 99% by mass or less, more preferably 70% by mass or more and 98% by mass or less, still more preferably 80% by mass or more and 95% by mass or less. When the content of the positive active material is in the above range, it is possible to achieve both high energy density and productivity of the positive active material layer.

The conductive agent is not particularly limited as long as it is a material exhibiting conductivity. Examples of such a conductive agent include carbonaceous materials, metals, and conductive ceramics. Examples of the carbonaceous materials include graphite, non-graphitic carbon, and graphene-based carbon. Examples of the non-graphitic carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly or two or more of these materials may be used in mixture. These materials may be composited and then used. For example, a material obtained by compositing carbon black with CNT may be used. Among these materials, carbon black is preferable from the viewpoint of electron conductivity and coatability, and in particular, acetylene black is preferable.

The content of the conductive agent in the positive active material layer is preferably 1% by mass or more and 10% by mass or less, more preferably 3% by mass or more and 9% by mass or less. When the content of the conductive agent falls within the above range, the energy density of the energy storage device can be enhanced.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the positive active material layer is preferably 1% by mass or more and 10% by mass or less, more preferably 2% by mass or more and 9% by mass or less, still more preferably 3% by mass or more and 6% by mass or less. When the content of the binder falls within the above range, the positive active material can be stably held.

Examples of the thickener include polysaccharide polymers such as carboxymethylcellulose (CMC) and methylcellulose. When the thickener has a functional group that is reactive with lithium and the like, the functional group may be deactivated by methylation or the like in advance. In the case of using a thickener, the content of the thickener in the positive active material layer can be 0.1% by mass or more and 8% by mass or less, and is typically preferably 5% by mass or less, more preferably 2% by mass or less. The technique disclosed herein can be preferably carried out in an aspect in which the positive active material layer contains no thickener.

The filler is not particularly limited. Examples of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof. In the case of using a filler, the content of the filler in the positive active material layer can be 0.1% by mass or more and 8% by mass or less, and is typically preferably 5% by mass or less, more preferably 2% by mass or less. The technique disclosed herein can be preferably carried out in an aspect in which the positive active material layer does not contain a filler.

The positive active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

(Negative Electrode)

The negative electrode 23 has, as mentioned above, a negative electrode substrate and a negative active material layer laminated on both surfaces of the negative electrode substrate. Further, the negative electrode may further have an intermediate layer between the negative electrode substrate and the negative active material layer. In addition, it is also possible to use a negative electrode that has a negative active material layer laminated on only one surface of a negative electrode substrate. The configuration of the intermediate layer, which may be provided for the negative electrode, is not particularly limited, and for example can be selected from the configurations exemplified for the positive electrode.

Although the negative electrode substrate may have the same configuration as that of the positive electrode substrate, as the material, metals such as copper, nickel, stainless steel, and nickel-plated steel or alloys thereof are used, and copper or a copper alloy is preferable. Examples of the negative electrode substrate include a foil, a deposited film, a mesh, and a porous material, and a foil is preferable from the viewpoint of costs. Accordingly, the negative electrode substrate is preferably a copper foil or a copper alloy foil. Examples of the copper foil include a rolled copper foil and an electrolytic copper foil.

The negative electrode substrate may be a plate or sheet that is substantially uniform in thickness. The average thickness of the negative electrode substrate is preferably 2 μm or more and 35 μm or less, more preferably 3 μm or more and 30 μm or less, still more preferably 4 μm or more and 25 μm or less, particularly preferably 5 μm or more and 20

μm or less. When the average thickness of the negative electrode substrate falls within the above-described range, it is possible to increase the energy density per volume of the energy storage device while increasing the strength of the negative electrode substrate.

The negative active material layer includes a negative active material. The negative active material layer contains optional components such as a conductive agent, a binder, a thickener, and a filler, if necessary. The optional components such as a conductive agent, a binder, a thickener, and a filler can be selected from the materials exemplified for the positive electrode.

The negative active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for a lithium ion secondary battery, a material capable of absorbing and releasing lithium ions is usually used. Examples of the negative active material include metal Li; metals or metalloids such as Si and Sn; metal oxides or metalloid oxides such as a Si oxide, a Ti oxide, and a Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative active material layer, one of these materials may be used singly, or two or more of these materials may be used in mixture.

The term "graphite" refers to a carbon material in which an average lattice spacing ($d_{002}$) of a (002) plane determined by an X-ray diffraction method before charge-discharge or in a discharged state is 0.33 nm or more and less than 0.34 nm. Examples of the graphite include natural graphite and artificial graphite.

The term "non-graphitic carbon" refers to a carbon material in which the average lattice spacing ($d_{002}$) of the (002) plane determined by the X-ray diffraction method before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol derived material.

In this regard, the "discharged state" of the carbon material means a state discharged such that lithium ions that can be occluded and released in association with charge-discharge are sufficiently released from the carbon material that is the negative active material. For example, the "discharged state" refers to a state where an open circuit voltage is 0.7 V or higher in a half cell that has, for use as a working electrode, a negative electrode containing a carbon material as a negative active material, and has metal Li for use as a counter electrode.

The "hardly graphitizable carbon" refers to a carbon material in which the $d_{002}$ is 0.36 nm or more and 0.42 nm or less.

The "easily graphitizable carbon" refers to a carbon material in which the $d_{002}$ is 0.34 nm or more and less than 0.36 nm.

The form of the negative active material is typically particles (powder). The average particle size of the negative active material can be, for example, 1 nm or more and 100 μm or less. When the negative active material is a carbon material, a titanium-containing oxide, or a polyphosphoric acid compound, the average particle size thereof may be preferably 1 μm or more and 100 μm or less in some cases, and may be more preferably 3 μm or more and 40 μm or less, further 20 μm or less in some cases. When the negative active material is Si, Sn, an oxide of Si, an oxide of Sn, or the like, the average particle size thereof may be preferably 1 nm or more and 1 μm or less in some cases. By setting the average particle size of the negative active material to be equal to or greater than the lower limit, the negative active material is easily produced or handled. By setting the average particle size of the negative active material to be equal to or less than the upper limit, the electron conductivity of the positive active material layer is improved. A crusher, a classifier, and the like are used to obtain a powder that has a predetermined particle size. In addition, when the negative active material is a metal such as metal Li, the form thereof may a foil.

As described above, at least one of the positive active material and the negative active material includes hollow active material particles. Examples of the hollow negative active material particles include graphite particles with hollows. As the hollow negative active material particles, known hollow negative active material particles described in above-mentioned Patent Document 2 and the like can be used, and the hollow negative active material particles can be produced by known methods described in Patent Document 2 and the like.

The content of the negative active material in the negative active material layer is preferably 60% by mass or more and 99% by mass or less, more preferably 90% by mass or more and 98% by mass or less. When the content of the negative active material falls within the above range, it is possible to achieve both high energy density and productivity of the negative active material layer. Further, when the negative active material is metal Li, the content of the negative active material in the negative active material layer may be 99% by mass or more, and may be 100% by mass.

(Separator)

The separator 22 can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining property of the electrolyte. As the material of the substrate layer of the separator, a polyolefin such as polyethylene or polypropylene is preferable from the viewpoint of a shutdown function, and polyimide, aramid or the like is preferable from the viewpoint of resistance to oxidation and decomposition. As the substrate layer of the separator, a material obtained by combining these resins may be used.

The heat resistant particles included in the heat resistant layer preferably have a mass loss of 5% or less in the case of temperature increase from room temperature to 500° C. under the air atmosphere of 1 atm, and more preferably have a mass loss of 5% or less in the case of temperature increase from room temperature to 800° C. Inorganic compounds can be mentioned as materials whose mass loss is less than or equal to a predetermined value when the materials are heated. Examples of the inorganic compounds include oxides such as iron oxide, silicon oxide, aluminum oxide, titanium dioxide, zirconium oxide, calcium oxide, strontium oxide, barium oxide, magnesium oxide and aluminosilicate; nitrides such as aluminum nitride and silicon nitride; carbonates such as calcium carbonate; sulfates such as barium sulfate; hardly soluble ionic crystals such as calcium fluoride, barium fluoride, barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compounds, a simple substance or a complex of these substances may be used alone, or two or more thereof may be used in mixture. Among these inorganic compounds, silicon oxide, aluminum oxide, or aluminosilicate is preferable from the viewpoint of safety of the energy storage device.

The porosity of the separator is preferably 80% by volume or less from the viewpoint of strength, and is preferably 20% by volume or more from the viewpoint of discharge performance. The "porosity" herein is a volume-based value, and means a value measured with a mercury porosimeter.

As the separator, a polymer gel composed of a polymer and an electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of the polymer gel has the effect of suppressing liquid leakage. As the separator, a polymer gel may be used in combination with a porous resin film, a nonwoven fabric, or the like as described above.

(Electrolyte Solution)

As the electrolyte solution, a nonaqueous electrolyte solution can be suitably used. The nonaqueous electrolyte solution contains a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, solvents in which some hydrogen atoms contained in these compounds are substituted with halogen may be used.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these examples, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these examples, DMC and EMC are preferable.

As the nonaqueous solvent, it is preferable to use at least one of the cyclic carbonate and the chain carbonate, and it is more preferable to use the cyclic carbonate and the chain carbonate in combination. By using the cyclic carbonate, dissociation of the electrolyte salt can be promoted to improve the ionic conductivity of the nonaqueous electrolyte solution. By using the chain carbonate, the viscosity of the nonaqueous electrolyte solution can be kept low. When the cyclic carbonate and the chain carbonate are used in combination, the volume ratio of the cyclic carbonate to the chain carbonate (cyclic carbonate:chain carbonate) preferably falls within the range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among these salts, the lithium salt is preferable.

Examples of the lithium salt include inorganic lithium salts such as $LiPF_6$, $LiPO_2F_2$, $LiBF_4$, $LiClO_4$, and $LiN(SO_2F)_2$, lithium oxalates such as lithium bis(oxalate)borate (LiBOB), lithium difluorooxalatoborate (LiFOB), and lithium bis(oxalate)difluorophosphate (LiFOP), and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these salts, the inorganic lithium salts are preferable, and $LiPF_6$ is more preferable.

The content of the electrolyte salt in the nonaqueous electrolyte solution is, at 20° C. under 1 atm, preferably 0.1 mol/dm$^3$ or more and 2.5 mol/dm$^3$ or less, more preferably 0.3 mol/dm$^3$ or more and 2.0 mol/dm$^3$ or less, still more preferably 0.5 mol/dm$^3$ or more and 1.7 mol/dm$^3$ or less, and particularly preferably 0.7 mol/dm$^3$ or more and 1.5 mol/dm$^3$ or less. The content of the electrolyte salt falls within the above range, thereby allowing the ionic conductivity of the nonaqueous electrolyte solution to be increased.

The nonaqueous electrolyte solution may contain an additive, besides the nonaqueous solvent and the electrolyte salt. Examples of the additive include halogenated carbonic acid esters such as fluoroethylene carbonate (FEC) and difluoroethylene carbonate (DFEC); oxalates such as lithium bis(oxalate)borate (LiBOB), lithium difluorooxalatoborate (LiFOB), and lithium bis(oxalate)difluorophosphate (LiFOP); imide salt such as lithium bis(fluorosulfonyl)imide (LiFSI); aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; vinylene carbonate, methylvinylene carbonate, ethylvinylene carbonate, succinic anhydride, glutaric anhydride, maleic anhydride, citraconic anhydride, glutaconic anhydride, itaconic anhydride, cyclohexanedicarboxylic anhydride; ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, 1,3-propenesultone, 1,3-propanesultone, 1,4-butanesultone, 1,4-butenesultone, perfluorooctane, tristrimethylsilyl borate, tristrimethylsilyl phosphate, tetrakistrimethylsilyl titanate, lithium monofluorophosphate, and lithium difluorophosphate. These additives may be used singly, or two or more thereof may be used in mixture.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, and particularly preferably 0.3% by mass or more and 3% by mass or less, with respect to a total mass of the nonaqueous electrolyte solution. When the content of the additive falls within the above range, it is possible to improve capacity retention performance or charge-discharge cycle performance after high-temperature storage, and to further improve safety.

For the electrolyte solution, an electrolyte solution with water as a solvent may be used.

<Method for Using Energy Storage Device>

The energy storage device 10 can be used in the same manner as conventionally known energy storage devices. In addition, the energy storage device 10 is used with the winding axis W of the electrode assembly 16 located parallel to the horizontal direction.

More specifically, a method for using an energy storage device according to an embodiment of the present invention includes: charging the energy storage device; and discharging the energy storage device, the energy storage device includes: an electrode assembly obtained by winding a band-shaped positive electrode including a positive active material layer, a band-shaped negative electrode including a negative active material layer, and a band-shaped separator in the longitudinal direction; an electrolyte solution; and a case that houses the electrode assembly and the electrolyte solution, where at least one of the positive active material layer and the negative active material layer contains a hollow active material particle, the winding axis of the electrode assembly is located parallel to the horizontal direction, at least a central part of the electrode assembly is pressed with the case pressed, an excess electrolyte solution that is a part of the electrolyte solution is present between the electrode assembly and the case, the lower end of the electrode assembly has contact with the excess electrolyte solution, and at least one of the following formulas 1 to 3 is satisfied, where H, Wc, Wa, and Ws respectively represent the height from the liquid level of the excess electrolyte solution to the upper end of the electrode assembly, the width of the positive active material layer, the width of the negative active material layer, and the width of the separator.

$$0.8H \leq Wc \leq 2.0H \quad \quad 1$$

$$0.9H \leq Wa \leq 2.1H \quad \quad 2$$

$$1.0H \leq Ws \leq 2.2H \quad \quad 3$$

In accordance with the method for using, high-power performance can be kept with the low resistance of the energy storage device, even when the charging and discharging are repeatedly performed. The energy storage device in accordance with the method for using has the same specific embodiments and suitable embodiments as the description of the energy storage device according to an embodiment of the present invention described above.

<Method for Manufacturing Energy Storage Device>

A method for manufacturing an energy storage device according to an embodiment of the present invention includes: housing an electrode assembly and an electrolyte solution in a case (housing step); and pressing the case (pressing step).

The electrode assembly is a winding-type electrode assembly obtained by winding a band-shaped positive electrode that has a positive active material layer, a band-shaped negative electrode that has a negative active material layer, and a band-shaped separator in a longitudinal direction. In addition, at least one of the positive active material layer and the negative active material layer has hollow active material particles. In the housing step, the winding axis of the electrode assembly is located parallel to the horizontal direction. For example, when the bottom surface of the case is horizontal, the winding axis of the electrode assembly is located parallel to the bottom surface of the case.

The manufacturing method may include, before the housing step, for example, fabricating a wound-type flattened electrode assembly and preparing an electrolyte solution. In addition, the manufacturing method may include sealing the case between the housing step and the pressing step.

The pressing step is performed by pressing the central part of the wall surfaces 19 of the case body 17 from both side surfaces along the X-axis direction, for example, in the condition of the energy storage device 10 in FIG. 1, such that at least the central part of the electrode assembly in the case is pressed. This pressing may deform the wall surfaces 19 of the case body 17 to be recessed as shown in FIGS. 1 and 4, and the deformed shape may be maintained as it is. The pressing can be performed with a conventionally known pressing member or the like. When the case body 17 (wall surfaces 19) is deformed by the pressing with the use of a pressing member, the pressing member may be removed as long as the deformed shape is maintained. In addition, for example, as in such an energy storage apparatus as described later, a pressing member may be used to keep a plurality of energy storage devices pressed, such that the respective cases of the energy storage devices are fixed in the pressed state.

Further, the manufacturing method may include performing initial charge-discharge. The initial charge-discharge may be a step of charging and discharging, one or more times, the energy storage device subjected to no charge-discharge. The initial charge-discharge may be performed after the pressing step or before the pressing step.

In the energy storage device obtained through the above-mentioned respective steps, at least a central part of the electrode assembly is pressed, and an excess electrolyte solution that is a part of the electrolyte solution is present between the electrode assembly and the case, with the lower end of the electrode assembly in contact with the excess electrolyte solution. Further, at least one of the following formulas 1 to 3 is satisfied, where H, Wc, Wa, and Ws respectively represent the height from the liquid level of the excess electrolyte solution to the upper end of the electrode assembly, the width of the positive active material layer, the width of the negative active material layer, and the width of the separator.

$$0.8H \leq Wc \leq 2.0H \quad \quad 1$$

$$0.9H \leq Wa \leq 2.1H \quad \quad 2$$

$$1.0H \leq Ws \leq 2.2H \quad \quad 3$$

The energy storage device through the respective steps mentioned above has the same specific embodiments and suitable embodiments as specific embodiments and suitable embodiments of the energy storage device described as an embodiment of the present invention.

In accordance with the manufacturing method, an energy storage device that satisfies the above-mentioned formula 1, formula 2, or formula 3 can be obtained by adjusting the amount of the electrolyte solution used, the size of the electrode assembly, and the like.

<Energy Storage Apparatus>

The energy storage device according to the present embodiment can be mounted as an energy storage apparatus (battery module) configured by assembling a plurality of energy storage devices on a power source for automobiles such as EV, HEV, and PHEV, a power source for electronic devices such as personal computers and communication terminals, or a power source for power storage, or the like. In this case, the technique according to one embodiment of the present invention may be applied to at least one energy storage device included in the energy storage apparatus.

Figure 7:
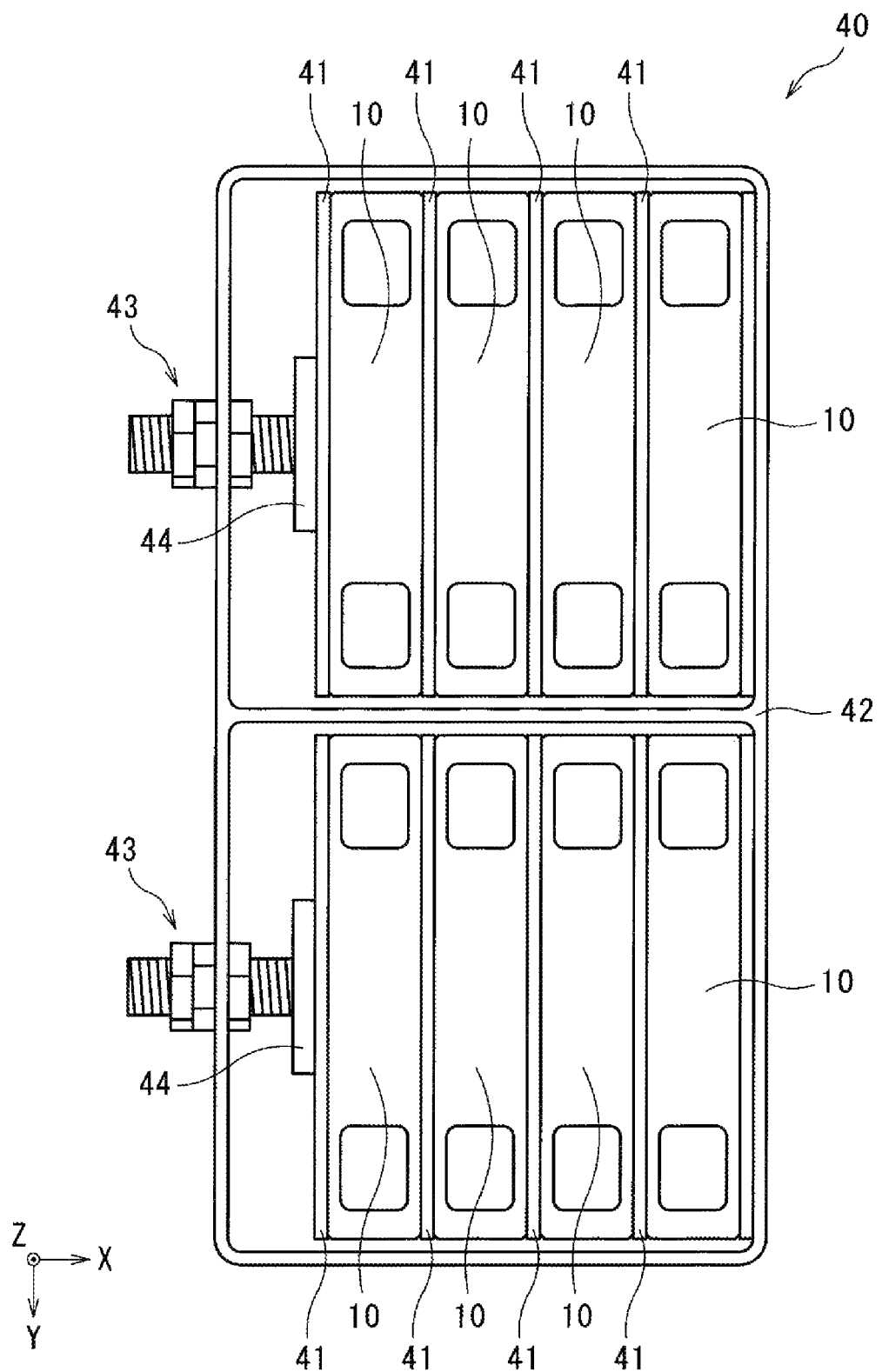
FIG. 7 is a schematic plan view illustrating an energy storage apparatus configured by assembling a plurality of energy storage devices according to FIG. 1.

An energy storage apparatus 40 shown in FIG. 7 has a plurality of energy storage devices 10. At least one of the plurality of energy storage devices 10 is the energy storage device (A), the energy storage device (B), or the energy storage device (C) according to an embodiment of the present invention. The plurality of energy storage devices 10 arranged with spacers 41 interposed therebetween are housed in a housing 42. The respective energy storage devices 10 are electrically connected to each other by a bus bar, not shown. In the energy storage apparatus 40, the rotation of nuts 43 causes flat plates 44 to press the respective energy storage devices 10 through the spacers 41. More specifically, in the energy storage apparatus 40, the nuts 43 and the flat plates 44 constitute a pressing member. Such a pressing member presses (presses against) the cases of the energy storage devices 10 to press at least a central part of the electrode assembly in each case. The shape, size, material, and the like of the spacers 41 are appropriately set such that the electrode assembly in the case of each energy storage device 10 is sufficiently pressed. In addition, the energy storage device 10 provided in the energy storage apparatus 40 has the same specific structure as that of the energy storage device 10 shown in FIG. 1 and the like, and the winding axis of the electrode assembly is located parallel to the horizontal direction.

OTHER EMBODIMENTS

The present invention is not limited to the above embodiments, and various modifications may be made without departing from the gist of the present invention. For example, a configuration according to one embodiment can additionally be provided with a configuration according to another embodiment, or a configuration according to one embodiment can partially be replaced with a configuration according to another embodiment or a well-known technique. Furthermore, a part of the configuration according to one embodiment can be removed. In addition, a well-known technique can be added to the configuration according to one embodiment.

In the above embodiment, although the case where the energy storage device is used as a chargeable and dischargeable secondary battery (for example, lithium ion secondary battery) has been described, the type, size, capacity, number of constituent components, and the like of the energy storage device are arbitrary. For example, the present invention can also be applied to an energy storage device including a plurality of electrode assemblies in a case. In this case, at least one electrode body has only to satisfy the requirements of the present invention in the relationship between the liquid level of the excess electrolyte solution and the electrode assembly. The energy storage device according to the present invention can also be applied to capacitors such as electric double layer capacitors and lithium ion capacitors, energy storage devices in which an electrolyte solution other than nonaqueous electrolyte solutions is used, and the like.

EXAMPLES

Hereinafter, the present invention will be described in more detail with reference to examples, but the present invention is not limited to the following examples.

Example 1

(Fabrication of Electrode Assembly)

A positive composite including hollow positive active material particles ($LiNi_{1/3}Co_{1/3}Mn_{1/3}O_2$, hollow secondary particles, area ratio: 60%, average particle size: 5 µm) was applied to both surfaces of a positive electrode substrate made of strip-shaped aluminum foil so as to provide a positive active material layer non-laminated part, and dried to form a positive active material layer. The width Wc of the positive active material layer was adjusted to be 90 mm, and the average thickness Tc (average thickness of positive electrode–average thickness of positive electrode substrate) of the positive active material layer was adjusted to be 0.06 mm. Thus, a band-shaped positive electrode was obtained. It is to be noted that the area ratio and average particle size of the hollow positive active material particles have values measured by the method mentioned above. The same applies to the following other active material particles.

A negative composite including hollow negative active material particles (spheroidized natural graphite, hollow secondary particles, area ratio: 80%, average particle size: 8 µm) was applied to both surfaces of a negative electrode substrate made of strip-shaped copper foil so as to provide a negative active material layer non-laminated part, and dried to form a negative active material layer. The width Wa of the negative active material layer was adjusted to be 95 mm, and the average thickness Ta (average thickness of negative electrode–average thickness of negative electrode substrate) of the negative active material layer was adjusted to be 0.08 mm. Thus, a band-shaped negative electrode was obtained.

Prepared was a band-shaped separator made of a polyethylene microporous membrane of 100 mm in width Ws and of 0.02 mm in average thickness Ts.

The band-shaped positive electrode and the band-shaped negative electrode were stacked on one another with the band-shaped separator interposed therebetween, and wound in the longitudinal direction to fabricate a flat electrode assembly.

$LiPF_6$ was dissolved at a salt concentration of 1.2 mol/$dm^3$ in a solvent obtained by mixing an ethylene carbonate and an ethyl methyl carbonate at a volume ratio of 30:70 to obtain a nonaqueous electrolyte solution.

The electrode assembly was housed into an aluminum prismatic case, and a positive electrode terminal and a negative electrode terminal were attached. The nonaqueous electrolyte solution was injected into the case, and then the case was sealed. Next, the wall surfaces of the case were pressed and then deformed from both side surfaces such that at least the central part of the electrode assembly in the case was pressed, thereby providing an energy storage device with the electrode assembly pressed.

The obtained energy storage device subjected to no charge-discharge was subjected to the following initial charge-discharge. At 25° C., constant current constant voltage charge was performed at a charge current of 0.2 C and an end-of-charge voltage of 4.1 V. With regard to the charge termination conditions, charge was performed until the total charge time reached 3 hours. After a lapse of a rest period of 10 minutes, constant current discharge was performed at a discharge current of 0.2 C to an end-of-discharge voltage of 2.5 V, followed by a rest period of 10 minutes. In each of examples and comparative examples, this charge-discharge was performed for 2 cycles.

After the initial charge-discharge, the energy storage device was left for 1 hour. For the energy storage device according to Example 1 after being left for 1 hour, the height H1 from the bottom surface of the case to the upper end of the electrode assembly and the height H2 from the bottom surface of the case to the liquid level of the excess electrolyte solution were measured by X-ray CT (computed tomography), and the height H (H1-H2) from the liquid level of the excess electrolyte solution to the upper end of the electrode assembly was determined. The height H1 was 60 mm, the height H2 was 10 mm, and the height H was 50 mm.

Examples 2 to 18, Comparative Examples 1 to 7

Energy storage devices according to each of Examples 2 to 18 and Comparative Examples 1 to 7 were obtained similarly to Example 1 except for the types (hollow or solid) of the positive active material particle and negative active material particle used, the height H1, the height H2, the width Wc of the positive active material layer, the width Wa of the negative active material layer, the width Ws of the separator, the average thickness Tc (average thickness of positive electrode–average thickness of positive electrode substrate) of the positive active material layer, and the average thickness Ta (average thickness of negative electrode–average thickness of negative electrode substrate) of the negative active material layer as shown in Table 1.

Further, single particles (primary particles, area ratio: 98%, average particle size: 5 μm) of $LiNi_{1/3}Co_{1/3}Mn_{1/3}O_2$ were used as the solid positive active material particles. In addition, crushed particles of bulk mesophase artificial graphite (area ratio: 98%, average particle size: 8 μm) were used as the solid negative active material particles.

[Evaluation]
(Charge-Discharge Cycle Test)

Each of the electrolyte energy storage devices subjected to initial charge-discharge according to the examples and the comparative examples was subjected to the following charge-discharge cycle test. At 25° C., constant current charge was performed at a charge current of 10 C and an end-of-charge voltage of 4.1 V. Thereafter, constant current discharge was performed at a discharge current of 10 C and an end-of-discharge voltage of 2.5 V. In each of examples and comparative examples, this charge-discharge was performed for 100 cycles.

The energy storage devices before and immediately after the "charge-discharge cycle test" were subjected to constant current charge at 1 C at 25° C. to adjust the SOC (State of Charge) up to 50%, and then discharged at 25° C. for 30 seconds at each current of 0.2 C, 0.5 C, and 1.0 C in this order. The relationship between the current at each discharge current and the voltage at 10 seconds after the start of discharge was plotted, and the resistance (direct-current resistance) was determined from the slope of a straight line obtained from the plot of 3 points. The respective resistances of the energy storage devices before and immediately after the charge-discharge cycle test are shown in Table 1 as relative values with the resistance of the energy storage device according to Example 1 as a reference (100).

TABLE 1

| | Positive material particle active | Negative material particle active | H1 | H2 | H (=H1—H2) | Wc (positive active material layer width) | | Wa (negative active material layer width) | | Ws (separator width) | | Tc | Ta | Ts |
|---|---|---|---|---|---|---|---|---|---|---|---|---|---|---|
| | — | — | mm | mm | mm | mm | — | mm | — | mm | — | mm | mm | mm |
| Example 1 | Hollow | Hollow | 60 | 10 | 50 | 90 | 1.80 H | 95 | 1.90 H | 100 | 2.00 H | 0.05 | 0.08 | 0.02 |
| Example 2 | Hollow | Hollow | 60: | 10 | 50 | 100 | 2.00 H | 105 | 2.10 H | 110 | 2.20 H | 0.06 | 0.08 | 0.02 |
| Comparative Example 1 | Hollow | Hollow | 60 | 10 | 50 | 110 | 2.20 H | 115 | 2.30 H | 120 | 2.40 H | 0.06 | 0.08 | 0.02 |
| Comparative Example 2 | Hollow | Hollow | 60 | 10 | 60 | 120 | 2.40 H | 125 | 2.50 H | 130 | 2.60 H | 0.06 | 0.08 | 0.02 |
| Comparative Example 3 | Hollow | Hollow | 60 | 10 | 50 | 140 | 2.80 H | 145 | 2.90 H | 150 | 3.00 H | 0.06 | 0.08 | 0.02 |
| Comparative Example 4 | Hollow | Hollow | 60 | 10 | 50 | 190 | 3.80 H | 195 | 3.90 H | 200 | 4.00 H | 0.06 | 0.08 | 0.02 |
| Example 3 | Hollow | Hollow | 60 | 10 | 50 | 80 | 1.60 H | 85 | 1.70 H | 90 | 1.80 H | 0.06 | 0.08 | 0.02 |
| Example 4 | Hollow | Hollow | 60 | 10 | 50 | 70 | 1.40 H | 75 | 1.50 H | 80 | 1.60 H | 0.06 | 0.08 | 0.02 |
| Example 5 | Hollow | Hollow | 60 | 10 | 50 | 60 | 1.20 H | 65 | 1.30 H | 70 | 1.40 H | 0.06 | 0.08 | 0.02 |
| Example 6 | Hollow | Hollow | 60 | 10 | 50 | 50 | 1.00 H | 55 | 1.10 H | 60 | 1.20 H | 0.06 | 0.08 | 0.02 |
| Example 7 | Hollow | Hollow | 60 | 10 | 50 | 40 | 0.80 H | 45 | 0.90 H | 50 | 1.00H | 0.06 | 0.08 | 0.02 |
| Comparative Example 5 | Hollow | Hollow | 60 | 10 | 50 | 30 | 0.60 H | 35 | 0.70 H | 40 | 0.80 H | 0.06 | 0.08 | 0.02 |
| Comparative Example 6 | Hollow | Hollow | 60 | 10 | 50 | 20 | 0.40 H | 25 | 0.50 H | 30 | 0.60 H | 0.06 | 0.08 | 0.02 |
| Example 8 | Hollow | Hollow | 60 | 5 | 55 | 90 | 1.64 H | 95 | 1.73 H | 100 | 1.82 H | 0.05 | 0.08 | 0.02 |
| Example 9 | Hollow | Hollow | 60 | 5 | 55 | 100 | 1.82 H | 105 | 1.91 H | 110 | 2.00 H | 0.06 | 0.08 | 0.02 |
| Example 10 | Hollow | Hollow | 60 | 5 | 55 | 90 | 1.64 H | 95 | 1.73 H | 100 | 1.82 H | 0.05 | 0.07 | 0.02 |
| Example 11 | Hollow | Hollow | 60 | 5 | 55 | 90 | 1.64 H | 95 | 1.73 H | 100 | 1.82 H | 0.04 | 0.05 | 0.02 |
| Example 12 | Hollow | Hollow | 60 | 5 | 55 | 90 | 1.64 H | 95 | 1.73 H | 100 | 1.82 H | 0.04 | 0.05 | 0.01 |
| Example 13 | Hollow | Hollow | 60 | 5 | 55 | 90 | 1.64 H | 95 | 1.73 H | 100 | 1.82 H | 0.07 | 0.09 | 0.02 |
| Example 14 | Hollow | Hollow | 60 | 5 | 55 | 90 | 1.64 H | 95 | 1.73 H | 100 | 1.82 H | 0.08 | 0.10 | 0.02 |
| Example 15 | Hollow | Hollow | 60 | 5 | 55 | 90 | 1.64 H | 95 | 1.73 H | 100 | 1.82 H | 0.09 | 0.11 | 0.02 |
| Example 16 | Hollow | Hollow | 60 | 5 | 55 | 90 | 1.64 H | 95 | 1.73 H | 100 | 1.82 H | 0.10 | 0.12 | 0.02 |
| Example 17 | Hollow | Solid | 60 | 10 | 50 | 90 | 1.80 H | 95 | 1.90 H | 100 | 2.00 H | 0.06 | 0.08 | 0.02 |
| Example 18 | Solid | Hollow | 60 | 10 | 50 | 90 | 1.80 H | 95 | 1.90 H | 100 | 2.00 H | 0.06 | 0.08 | 0.02 |
| Comparative Example 7 | Solid | Solid | 60 | 10 | 50 | 90 | 1.80 H | 95 | 1.90 H | 100 | 2.00 H | 0.06 | 0.08 | 0.02 |

TABLE 1-continued

|  | 500 (Tc + Ta + Ts) mm | — | Resistance (relative value) Before charge-discharge cycle test — | Resistance (relative value) After charge-discharge cycle test — |
|---|---|---|---|---|
| Example 1 | 80 | 1.60 H | 100 | 100 |
| Example 2 | 80 | 1.60 H | 98 | 111 |
| Comparative Example 1 | 80 | 1.60 H | 95 | 121 |
| Comparative Example 2 | 80 | 1.60 H | 90 | 131 |
| Comparative Example 3 | 30 | 1.60 H | 85 | 139 |
| Comparative Example 4 | 80 | 1.60 H | 80 | 160 |
| Example 3 | 80 | 1.60 H | 102 | 102 |
| Example 4 | 80 | 1.50 H | 105 | 103 |
| Example 5 | 89 | 1.60 H | 110 | 105 |
| Example 6 | 80 | 1.60 H | 115 | 107 |
| Example 7 | 80 | 1.60 H | 125 | 116 |
| Comparative Example 5 | 30 | 1.60 H | 135 | 124 |
| Comparative Example 6 | 80 | 1.60 H | 150 | 138 |
| Example 8 | 80 | 1.45 H | 100 | 100 |
| Example 9 | 80 | 1.45 H | 98 | 98 |
| Example 10 | 70 | 1.27 H | 100 | 105 |
| Example 11 | 55 | 1.00 H | 100 | 107 |
| Example 12 | 50 | 0.9 1H | 100 | 118 |
| Example 13 | 90 | 1.64 H | 102 | 103 |
| Example 14 | 100 | 1.82 H | 104 | 106 |
| Example 15 | 110 | 2.00 H | 106 | 110 |
| Example 16 | 120 | 2.18 H | 108 | 118 |
| Example 17 | 80 | 1.60 H | 110 | 109 |
| Example 18 | 80 | 1.60 H | 110 | 109 |
| Comparative Example 7 | 80 | 1.60 H | 130 | 128 |

As shown in Table 1, it is determined that the energy storage device according to each example in which hollow active material particles are used for the positive active material or the negative active material, and in which the relationship between the height H from the liquid level of the excess electrolyte solution to the upper end of the electrode assembly and the width Wc of the positive active material layer, the width Wa of the negative active material layer, or the width Ws of the separator falls within a predetermined range has a low resistance (relative value) of 120 or less after the charge-discharge cycle test. In addition, from comparisons and the like among the respective energy storage devices according to Examples 10 to 16, it is determined that the resistance after the charge-discharge cycle test is further reduced when the relationship between: the sum of the average thickness Tc of the positive active material layer, the average thickness Ta of the negative active material layer, and the average thickness Ts of the separator; and the height H from the liquid level of the excess electrolyte solution to the upper end of the electrode assembly falls within a predetermined range.

INDUSTRIAL APPLICABILITY

The present invention can be applied to a nonaqueous electrolyte energy storage device used as a power source for automobiles, other vehicles, electronic devices, and the like.

DESCRIPTION OF REFERENCE SIGNS

10: energy storage device
11: case
12: positive electrode terminal
13: negative electrode terminal
14: positive current collector
15: negative current collector
16: electrode assembly
16A: curved part
17: case body
18: lid body
19: wall surface
21: positive electrode
22 (22a, 22b): separator
23: negative electrode
25: positive electrode substrate
26: positive active material layer
27: negative electrode substrate
28: negative active material layer
29: positive active material layer non-laminated part
30: negative active material layer non-laminated part
31: excess electrolyte solution
40: energy storage apparatus
41: spacer
42: housing
43: nut
44: flat plate

The invention claimed is:

1. An energy storage device comprising:
an electrode assembly obtained by winding a band-shaped positive electrode including a positive active material layer, a band-shaped negative electrode including a negative active material layer, and a band-shaped separator in a longitudinal direction;

an electrolyte solution; and a case that houses the electrode assembly and the electrolyte solution, wherein at least one of the positive active material layer and the negative active material layer contains a hollow active material particle, a winding axis of the electrode assembly is located parallel to a horizontal direction, at least a central part of the electrode assembly is pressed with the case pressed, an excess electrolyte solution that is a part of the electrolyte solution is present between the electrode assembly and the case, a lower end of the electrode assembly has contact with the excess electrolyte solution, and at least one of formulas 1 to 3 below is satisfied, where H, Wc, Wa, and Ws respectively represent a height from a liquid level of the excess electrolyte solution to an upper end of the electrode assembly, a width of the positive active material layer, a width of the negative active material layer, and a width of the separator:

$$0.8H \leq Wc \leq 2.0H \qquad 1$$

$$0.9H \leq Wa \leq 2.1H \qquad 2$$

$$1.0H \leq Ws \leq 2.2H \qquad 3.$$

2. The energy storage device according to claim 1, wherein a relationship between: an average thickness Tc of the positive active material layer, an average thickness Ta of the negative active material layer, and an average thickness Ts of the separator; and the height H satisfies formula 4 below:

$$1.0H \leq 500(Tc+Ta+Ts) \leq 2.0H \qquad 4.$$

3. An energy storage apparatus comprising one or more energy storage devices, wherein at least one of the one or more energy storage devices is the energy storage device according to claim 1.

4. The energy storage device according to claim 1, wherein all of the formulas 1 to 3 are satisfied.

5. A method for manufacturing an energy storage device, the method comprising:

housing, in a case, an electrode assembly obtained by winding a band-shaped positive electrode including a positive active material layer, a band-shaped negative electrode including a negative active material layer, and a band-shaped separator in a longitudinal direction, and an electrolyte solution; and pressing the case, wherein at least one of the positive active material layer and the negative active material layer contains a hollow active material particle, a winding axis of the electrode assembly is located parallel to a horizontal direction in the housing, at least a central part of the electrode assembly is pressed by the pressing, an excess electrolyte solution that is a part of the electrolyte solution is present between the electrode assembly and the case, a lower end of the electrode assembly has contact with the excess electrolyte solution, and at least one of formulas 1 to 3 below is satisfied, where H, Wc, Wa, and Ws respectively represent a height from a liquid level of the excess electrolyte solution to an upper end of the electrode assembly, a width of the positive active material layer, a width of the negative active material layer, and a width of the separator:

$$0.8H \leq Wc \leq 2.0H \qquad 1$$

$$0.9H \leq Wa \leq 2.1H \qquad 2$$

$$1.0H \leq Ws \leq 2.2H \qquad 3.$$

6. The method according to claim 5, wherein all of the formulas 1 to 3 are satisfied.

7. The method according to claim 5, wherein a relationship between: an average thickness Tc of the positive active material layer, an average thickness Ta of the negative active material layer, and an average thickness Ts of the separator; and the height H satisfies formula 4 below:

$$1.0H \leq 500(Tc+Ta+Ts) \leq 2.0H \qquad 4.$$

* * * * *